US007021533B2

(12) United States Patent
Stephenson

(10) Patent No.: US 7,021,533 B2
(45) Date of Patent: Apr. 4, 2006

(54) TRANSACTION CARD WITH MEMORY AND POLYMER DISPERSED CHOLESTERIC LIQUID CRYSTAL DISPLAY

(75) Inventor: Stanley W. Stephenson, Spencerport, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/915,022

(22) Filed: Aug. 10, 2004

(65) Prior Publication Data

US 2005/0006463 A1 Jan. 13, 2005

Related U.S. Application Data

(62) Division of application No. 10/085,851, filed on Feb. 28, 2002.

(51) Int. Cl.
*G06K 5/00* (2006.01)

(52) U.S. Cl. ........................ 235/380; 235/492; 349/86

(58) Field of Classification Search ................ 235/380, 235/492, 375, 376, 487; 349/86, 175, 92, 349/35, 156

See application file for complete search history.

(56) References Cited

U.S. PATENT DOCUMENTS

| | | | |
|---|---|---|---|
| 3,600,060 A | 8/1971 | Kettering et al. | |
| 4,435,047 A | 3/1984 | Fergason | |
| 4,797,542 A | 1/1989 | Hara | |
| 5,055,662 A | 10/1991 | Hasegawa | |
| 5,437,811 A | 8/1995 | Doane et al. | |
| 6,052,137 A * | 4/2000 | Shimada | 347/171 |
| 6,061,107 A | 5/2000 | Yang et al. | |
| 6,068,183 A | 5/2000 | Freeman et al. | |
| 6,580,481 B1 * | 6/2003 | Ueda et al. | 349/115 |
| 6,710,760 B1 * | 3/2004 | Johnson et al. | 345/94 |
| 2001/0015788 A1 * | 8/2001 | Mandai et al. | 349/172 |
| 2002/0186182 A1 * | 12/2002 | Stephenson et al. | 345/50 |
| 2003/0156090 A1 * | 8/2003 | Munn et al. | 345/97 |
| 2004/0004821 A1 * | 1/2004 | Frey et al. | 361/721 |

FOREIGN PATENT DOCUMENTS

| | | |
|---|---|---|
| DE | 31 40 743 | 4/1983 |
| DE | 197 32 161 | 1/1999 |
| EP | 0 291 259 | 11/1988 |
| EP | 1 087 253 | 3/2001 |
| JP | 2000-226581 A * | 8/2000 |
| WO | WO 98/52097 | 11/1998 |
| WO | WO/00/03353 | 1/2000 |

* cited by examiner

*Primary Examiner*—Jared J. Fureman
(74) *Attorney, Agent, or Firm*—Lynne M. Blank

(57) ABSTRACT

A transaction card having machine readable information and a visible display comprising: a card body; machine readable information on the card body; and a flexible display affixed to the card body for displaying information related to the machine readable information, the display including a pressure-insensitive polymer-dispersed cholesteric liquid crystal material having a first planar reflective state and a second transparent focal conic state, which is responsive to an applied voltage to display information wherein said information persists when the voltage is removed, and an array of conductors connected to the display for applying selected voltages from an external display driver to the display to change the state of the display.

6 Claims, 6 Drawing Sheets

TRANSACTION CARD WITH MEMORY AND POLYMER DISPERSED CHOLESTERIC LIQUID CRYSTAL DISPLAY

CROSS REFERENCE TO RELATED APPLICATION

This is a divisional of application Ser. No. 10/085,851, filed Feb. 28, 2002.

Reference is made to commonly assigned U.S. patent application Ser. No. 09/379,776, filed Aug. 24, 1999 by Dwight J. Petruchik et al., now U.S. Pat. No. 6,394,870 and U.S. patent application Ser. No. 09/723,389, filed Nov. 28, 2000 by David M. Johnson et al., now U.S. Pat. No. 6,710,760 the disclosures of which are incorporated herein by reference.

FIELD OF THE INVENTION

The present invention relates to cards having machine readable information and separate display.

BACKGROUND OF THE INVENTION

Currently, information can be displayed using assembled sheets of paper carrying permanent inks or displayed on electronically modulated surfaces such as cathode ray displays or liquid crystal displays. Other sheet materials can carry magnetically writable areas to carry ticketing or financial information, however magnetically written data is not visible.

Current flat panel displays use two transparent glass plates as substrates. In a typical embodiment, such as one set forth in U.S. Pat. No. 5,503,952, a set of electrical traces is sputtered in pattern of parallel lines that form a first set of conductive traces. A second substrate is similarly coated with a set of traces having a transparent conductive coating. Coatings are applied and the surfaces rubbed to orient liquid crystals. The two substrates are spaced apart and the space between the two substrates is filled with a liquid crystal material. Pairs of conductors from either set are selected and energized to alter the optical transmission properties of the liquid crystal material. Such displays are expensive, and currently are limited to applications having long lifetimes.

Fabrication of flexible, electronically written display sheets using conventional nematic liquid crystals materials is disclosed in U.S. Pat. No. 4,435,047. A first sheet has transparent indium-tin-oxide (ITO) conductive areas and a second sheet has electrically conductive inks printed on display areas. The sheets can be thin glass, but in practice have been formed of Mylar polyester. A dispersion of liquid crystal material in a binder is coated on the first sheet, and the second sheet is bonded to the liquid crystal material. Electrical potential is applied to opposing conductive areas to operate on the liquid crystal material and expose display areas. The display uses nematic liquid crystal materials, which ceases to present an image when de-energized. Privacy windows are created from such materials using the scattering properties of conventional nematic liquid crystals. Nematic liquid crystals require continuous electrical drive to remain transparent.

U.S. Pat. No. 5,437,811 discloses a light-modulating cell having a chiral nematic liquid crystal in polymeric domains contained by conventional patterned glass substrates. The chiral nematic liquid crystal has the property of being driven between a planar state reflecting a specific visible wavelength of light and a light scattering focal conic state. Chiral nematic material has the capacity of maintaining one of the given states in the absence of an electric field.

Published U.S. patent application No. 2001/0015788 A1 published Aug. 23, 2001 by Mandai et al discloses display cards supporting a memory type cholesteric liquid crystal display A plurality of first and second terminals are provided on the back of the card so that the display can be changed by an external writing device. A problem with such memory type cholesteric liquid crystal displays is that they are pressure sensitive. If the display area of the card is flexed, thereby applying pressure to the liquid crystals in the display, the display can change state, thereby obscuring the data written on the display. This is particularly a problem for a card that is to be carried by a person in a pocket or wallet, since the likelihood that the card will be flexed in such a circumstance is high. There is a need therefore for an improved display card that is not pressure sensitive.

SUMMARY OF THE INVENTION

It is an object of the present invention to provide a transaction card having a memory element and a power-free display element.

It is another object of the present invention to provide a display for a transaction card that is pressure insensitive and can bend.

It is a further object of the invention to provide a system for reading information from such a transaction card, operation information from such a transaction card and to change the information on the display.

These objects are achieved by providing a transaction card having machine readable information and a visible display comprising: a card body; machine readable information on the card body; and a flexible display affixed to the card body for displaying information related to the machine readable information, the display including a pressure-insensitive polymer-dispersed cholesteric liquid crystal material having a first planar reflective state and a second transparent focal conic state, which is responsive to an applied voltage to display information wherein said information persists when the voltage is removed, and an array of conductors connected to the display for applying selected voltages from an external display driver to the display to change the state of the display.

The invention provides an inexpensive means for providing machine readable information in conjunction with an electrically updateable display.

DETAILED DESCRIPTION OF THE INVENTION

Figure 1:
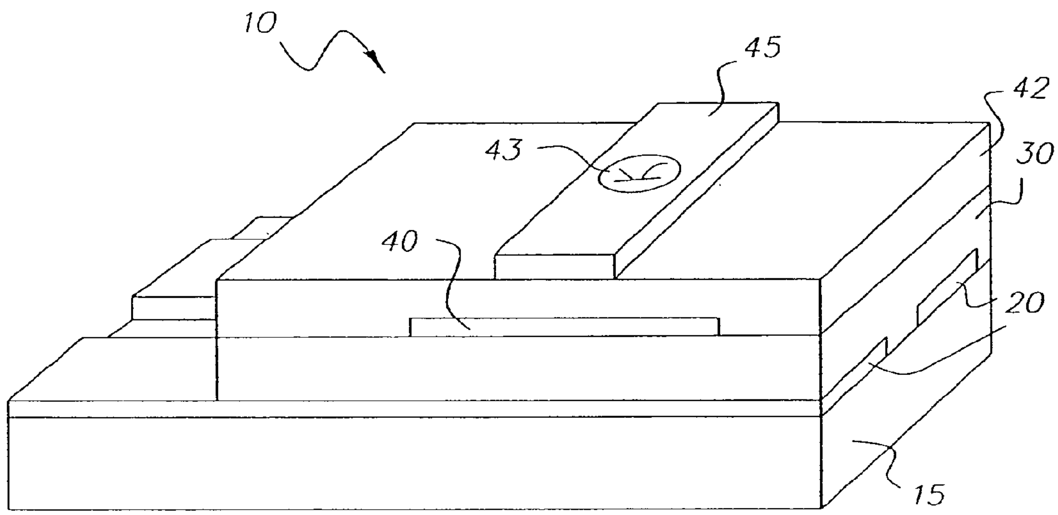
FIG. 1 is an isometric partial view of a cholesteric liquid crystal display made in accordance with the present invention.

FIG. 1 is an isometric partial view of a new structure for a display 10 made in accordance with the invention. Display 10 includes a flexible substrate 15, which is a thin transparent polymeric material, such as KODAK ESTAR polymer film base formed of polyester plastic that has a thickness of between 20 and 200 microns. In an exemplary embodiment, substrate 15 can be a 125 micron thick sheet of polyester film base. Other polymers, such as transparent polycarbonate, can also be used.

First patterned conductors 20 are formed over substrate 15. First patterned conductors 20 can be tin-oxide or indium-tin-oxide (ITO), with ITO being the preferred material. Typically, the material of first patterned conductors 20 is sputtered as a layer over substrate 15 having a resistance of less than 250 ohms per square. The layer is then patterned to form first patterned conductors 20 in any well known manner. Alternatively, first patterned conductors 20 can be an opaque electrical conductor material such as copper, aluminum or nickel. If first patterned conductors 20 are opaque metal, the metal can be a metal oxide to create light absorbing first patterned conductors 20. First patterned conductors 20 are formed in the conductive layer by conventional lithographic or laser etching means.

A polymer dispersed cholesteric layer 30 overlays first patterned conductors 20. Polymer dispersed cholesteric layer 30 includes a polymeric dispersed cholesteric liquid crystal material, such as the gelatin dispersed liquid crystal material described herein. Liquid crystal materials disclosed in U.S. Pat. No. 5,695,682, the disclosure of which is incorporated by reference, may also be suitable if the ratio of polymer to liquid crystal is chosen to render the composition insensitive to pressure. Application of electrical fields of various intensity and duration can drive a chiral nematic material (cholesteric) into a reflective state, to a transmissive state, or an intermediate state. These materials have the advantage of maintaining a given state indefinitely after the field is removed. Cholesteric liquid crystal materials can be MERCK BL112, BL118 or BL126, available from E.M. Industries of Hawthorne, N.Y.

In the preferred embodiment, polymer dispersed cholesteric layer 30 is E.M. Industries' cholesteric material BL-118 dispersed in deionized photographic gelatin. The liquid crystal material is dispersed at 8% concentration in a 5% deionized gelatin aqueous solution. The mixture is dispersed to create 10 micron diameter domains of the liquid crystal in aqueous suspension. The material is coated over a patterned ITO polyester sheet, and the material is dried to relative humidity, making it unnecessary to seal the edges of the liquid crystal material, to provide a 9 micron thick polymer dispersed cholesteric coating. Other organic binders such as polyvinyl alcohol (PVA) or polyethylene oxide (PEO) can be used. Such materials can be machine coated and dried on the patterned sheet on equipment used to coat photographic films. The resulting liquid crystal display according to the present invention is flexible and pressure insensitive, making displayed information insensitive to bending or pressure exerted for example by a user's finger on the display. Large sheets of such materials can be produced on manufacturing equipment and cut into individual displays. One preferred method of making such emulsions, using limited coalescence, is disclosed in EP1 115 026A, which is hereby incorporated by reference in its entirety.

Second patterned conductors 40 overlay polymer dispersed cholesteric layer 30. Second patterned conductors 40 should have sufficient conductivity to carry a field across polymer dispersed cholesteric layer 30. Second patterned conductors 40 can be formed in a vacuum environment using materials such as aluminum, tin, silver, platinum, carbon, tungsten, molybdenum, tin or indium or combinations thereof. The second patterned conductors 40 are as shown in the form of a deposited layer. Oxides of said metals can be used to darken second patterned conductors 40. The metal material can be excited by energy from resistance heating, cathodic arc, electron beam, sputtering, or magnetron excitation. Tin-oxide or indium-tin oxide coatings permit second patterned conductors 40 to be transparent.

In a preferred embodiment, second patterned conductors 40 are printed conductive ink such as ELECTRODAG 423SS screen printable electrical conductive material from Acheson Corporation. Such printed materials are finely divided graphite particles in a thermoplastic resin. The second patterned conductors 40 are formed using printed inks to reduce cost display. The use of a flexible support for substrate 15, laser etching to form first patterned conductors 20, machine coating polymer dispersed cholesteric layer 30, and printing second patterned conductors 40 permits the fabrication of very low cost memory displays.

A dielectric can be printed over second patterned conductors 40 and have openings through via 43 that permit interconnection between second patterned conductors 40 and conductive traces that form traces to define row conductors 45. Row conductors 45 can be the same screen printed electrically conductive material used to form second patterned conductors 40.

Figure 2:
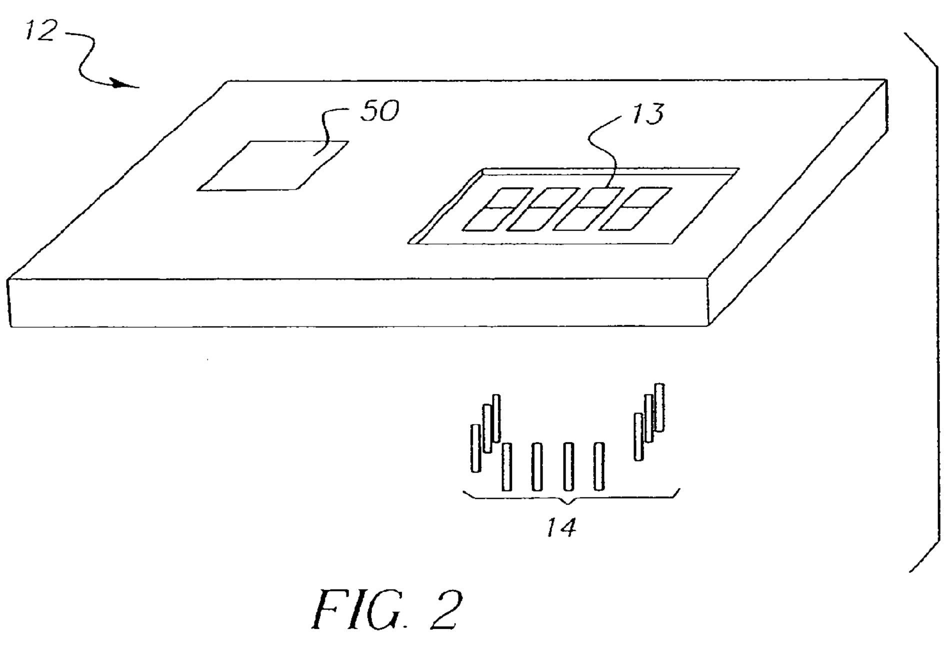
FIG. 2 is an isometric view of the display in FIG. 1 attached to a transaction card.

FIG. 2 is an isometric view of the display in FIG. 1 attached to a transaction card. Transaction card 12 includes a card body that comprises, for example, a thermoplastic polymer selected from the group consisting of polyester and polycarbonate. Transaction card 12 can be a transparent sheet, approximately 0.5 millimeter in thickness which has information printed on one surface. A viewing area 13 provides an area for viewing the contents of display 10, which has been bonded to the opposite side of transaction card 12. Display 10 in this example has a transparent substrate 15, and is inverted from the position shown in FIG. 1 during the attachment process. Information written to display 10 is seen through viewing area 13 of transaction card 12 and through transparent substrate 15. Viewing area 13 can also be an opening in transaction card 12. The liquid-crystal display 10 can also be conductively and adhesively applied to conductors on the transaction card 12.

Transaction card 12 with attached display 10 can be inserted into a holder (not shown) and contacts 14 in the holder can connect during the insertion process to conductors on display 10 to update information on display 10. Transaction card 12 can be used a financial transaction (credit/debit) card typically requiring less than 10,000 updated images. The term "transaction card" includes authorization or transaction cards utilized to authorize or conduct some form of transaction, which may involve a monetary transaction or other type of transaction, such as access to a location. Other transaction card applications for the liquid crystal display and system of the present invention will be apparent to the skilled artisan, for example, transaction/authorization cards such as parking lot cards that can receive information on times in and out and parking fees and then calculate a balance. A parking card is disclosed in JP 60215288. Other cards include, for example, a shopping card such as described in JP 01192593A, cards for vending machines such as described in JP 2001291152A, shopping cards such as describe in, security cards, gift cards, bank deposit cards, telephone cards, and the like. The information displayed on the transaction cards can be, for example, balance information. The combination of a monetary balance on a gift card or credit/debit card is typical of the information that can be displayed, although other type of information that is displayed in transaction/authorization cards can also be displayed, such as for example, credit limits or balances, debit limits, extent of authorization, account nos., bar codes, dates, names, and even low-resolution black-and-white images. The above cited reference related to types of transaction cards are hereby incorporated by reference.

Other additional card features, such as found in the multi-card described in WO 01/61640 A1 and the electronic card described in U.S. Pat. No. 6,308,890 B1, hereby incorporated by reference in its entirety. The transaction card of the present invention may have displays in addition to the type described herein. Security features such as described in the prior art can also be included, for example, as mentioned in WO 89/08899, as will be understood by the skilled artisan. The transaction card may also have decorative indicia, advertising indicia, or printed images of various types and designs.

Transaction card 12 further includes a memory element 50 that contains machine readable information. In one embodiment, memory element 50 is a packaged semiconductor chip attached to transaction card 12 with interconnections that permit electrical reading and writing of information to the semiconductor element. Cards without displays 10 are known as Smart Cards and conform to the ISO 7816 standard, and CR80 package. Memory element 50 can also be a printed bar code of conventional design such as bar code formats: 2/5, 3/9, 128-A,B,C,telepen, EAN 8,UPC-A, E, EAN 128, MSI and ITF. Memory element 50 can also be an area of magnetically responsive material printed onto a surface of transaction card 12 corresponding to ISO-7811. The machine readable information in the memory element is employed according to the present invention to derive data that is written on the display 13.

Figure 3:
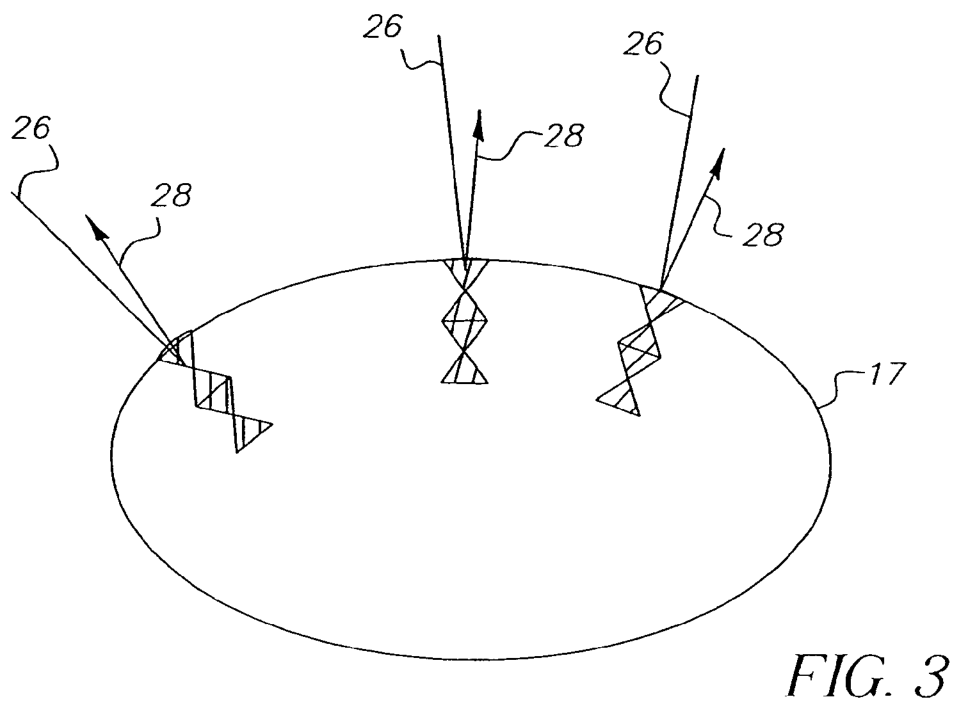
FIG. 3 is a sectional view of a spherical domain containing chiral nematic liquid crystal material.
Figure 4A:
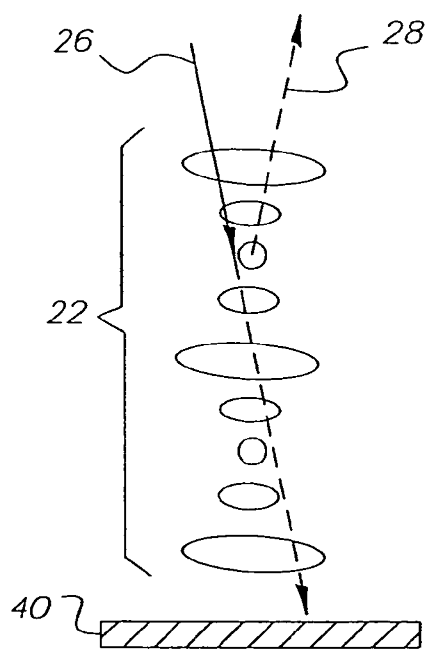
FIG. 4A is a schematic sectional view of a chiral nematic material in a planar state reflecting light.
Figure 4B:
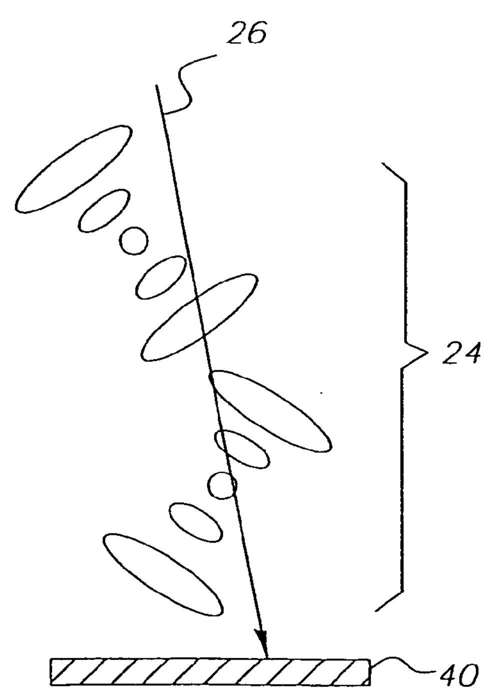
FIG. 4B is a schematic sectional view of a chiral nematic material in a focal conic state transmitting light.

FIG. 3 is a sectional view of a spherical domain containing chiral nematic liquid crystal material in accordance with the preferred embodiment of the invention. Domains 17 are encapsulated with sufficient polymer so the spherical structures can maintain an optical state when pressure of bending forces area applied to polymer dispersed cholesteric layer 30. This state is achieved using the formulation of the preferred embodiment. Domains 167 have the further advantage that the off-axis brightness of light reflected from cholesteric material within domain 17 is improved over cholesteric liquid crystal confined between two flattened glass surfaces.

FIG. 3A and FIG. 3B show two stable states of cholesteric liquid crystals. In FIG. 3A, a high voltage field has been applied and quickly switched to zero potential, which converts cholesteric liquid crystal to a planar state 22. Incident light 26 striking cholesteric liquid crystal in planar state 22 is reflected as reflected light 28 to create a bright image. In FIG. 3B, application of a lower voltage field leaves cholesteric liquid crystals in a transparent focal conic state 24. Whenever incident light 26 strikes a cholesteric liquid crystal in focal conic state 24, such light is transmitted. Second patterned conductors 40 can be black which will absorb incident light 26 to create a dark image when the liquid crystal material is in focal conic state 24. As a result, a viewer perceives a bright or dark image depending on if the cholesteric material is in planar state 22 or focal conic state 24, respectively.

Figure 5:
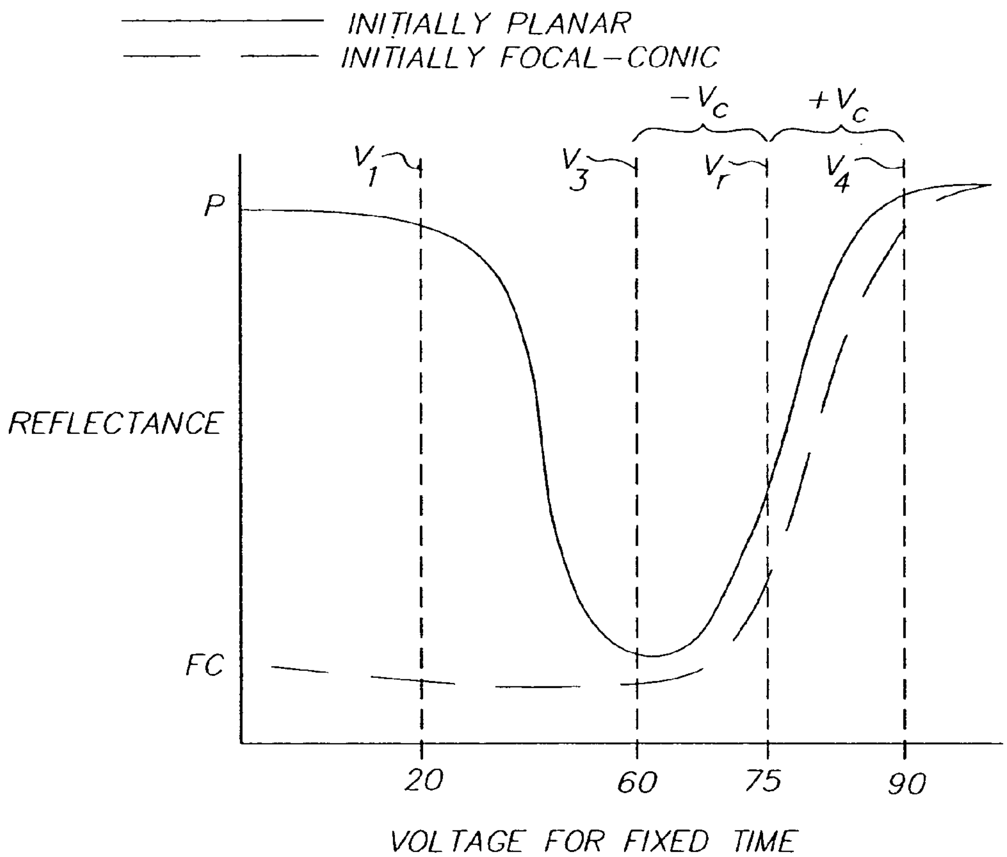
FIG. 5 is a plot of the response of a first polymer dispersed cholesteric material to a pulsed electrical field with a first set of imposed voltages.

FIG. 5 is a plot of the response of a cholesteric material to a pulsed electrical field. Such curves can be found in U.S. Pat. Nos. 5,453,863 and 5,695,682 and are also found in: "Liquid Crystal Dispersions", World Science, Singapore, 1995, By Paul Drzaic. For a given pulse time, typically between 5 and 200 milliseconds, a pulse at a given voltage can change the optical state of a cholesteric liquid crystal. A unipolar drive scheme is disclosed in commonly assigned, copending U.S. Ser. No. 09/938,047, hereby incorporated by reference.

In an experiment, gelatin dispersed cholesteric material dispersed and coated to the preferred embodiment was coated over ITO coated flexible substrate 15 to form polymer dispersed cholesteric layer 30. A one inch square conductive patch was printed over the gelatin dispersed cholesteric material to provide a field across the coating. A 20 millisecond unipolar field was switched across display 10 every 5 seconds to switch the state of the material between the planar and focal conic states. The gelatin dispersed cholesteric material was driven through a limited life test of 10,000 rewrites. The life testing was equivalent to 200 seconds of continuous applied unipolar voltage to display 10. The test patch operated with no apparent visible degradation throughout the life test. The life test was then extended to 100,000 cycles. The test display 10 continued to perform with little degradation. From this experiment, it was concluded that polymeric dispersed cholesteric materials on flexible substrates 15 with printed conductors can be driven by unipolar (DC) fields for at least the limited number of life cycles needed for limited-life display applications. Such displays benefit from a drive scheme that uses inexpensive, simple switching chips operating on a single voltage.

Figure 6:
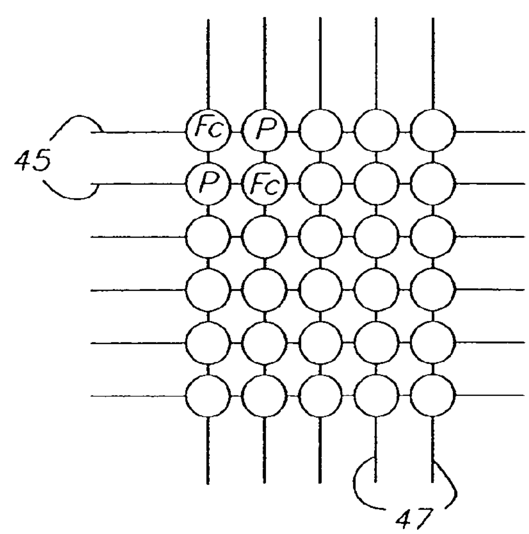
FIG. 6 is a schematic representation of a matrix array of cholesteric liquid crystal elements.

FIG. 6 is a schematic representation of a matrix array of cholesteric liquid crystal elements written using a unipolar drive scheme. Row voltage Vr is set midway between V3 and V4 on a selected row while the remaining rows are set to a ground voltage. A positive or negative column voltage Vc is set across all column conductors 47 to offset VR to either focal conic voltage V3 or planar voltage V4, depending on the desired final state of a row of pixels. The positive and negative column voltages VR-V3 and V4-VR are less than disturbance voltage V1 so that rows at ground potential experience voltages less than disturbance voltage V1 and are not changed. These material characteristics permit sequential row writing.

Figure 7:
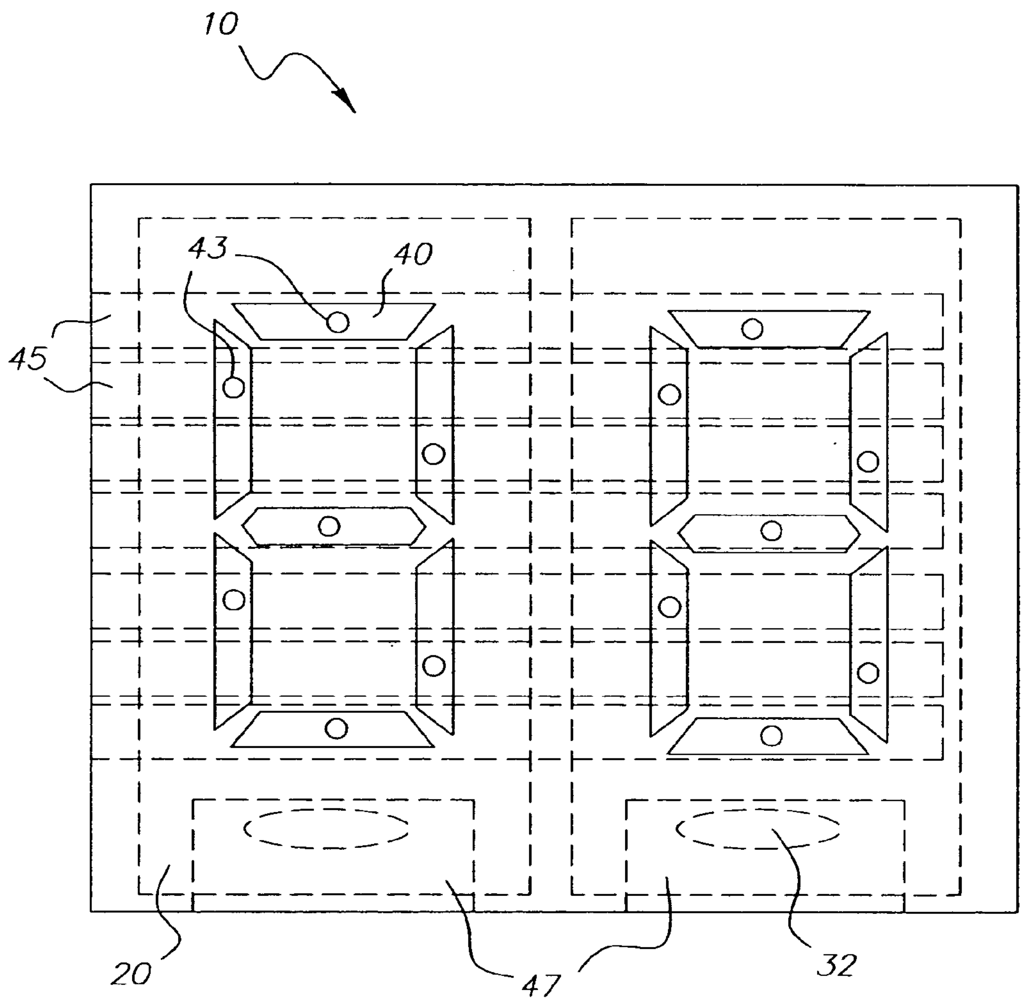
FIG. 7 is a front view of the display of FIG. 1.

FIG. 7 is a front view of the display of FIG. 1. Display 10 is a seven-segment display organized into a writable matrix addressing structure. Looking through substrate 15, a transparent conductor is patterned to define first patterned conductor 20, which are transparent conductive electrodes over each seven-segment character. Polymer dispersed cholesteric layer 30 is coated behind patterned first conductors 20. A portion of polymer dispersed cholesteric material 30 is removed to form connection area 32 for each printed column conductor 47. Second patterned conductors 40 are printed to form each of the seven segments for each character within the boundaries of first patterned conductor 20. Dielectric 42 is printed across the display with through via 43 to permit electrical connection to each character segment formed by second patterned conductor 40. A final layer of conductive material is printed across the back of the display to form row conductors 45. The display 10 is an addressable matrix cholesteric display. Display 10 has seven row conductors 45 and multiple column conductors 47. Where one of the column conductors 47 and the second patterned conductor 40 connected to row conductors 45 overlap, they define a selectable pixel or segment to be viewable or non-viewable. Other types of displays and display drivers are described in the above-cited Drzaic reference or known in the art.

Figure 8:
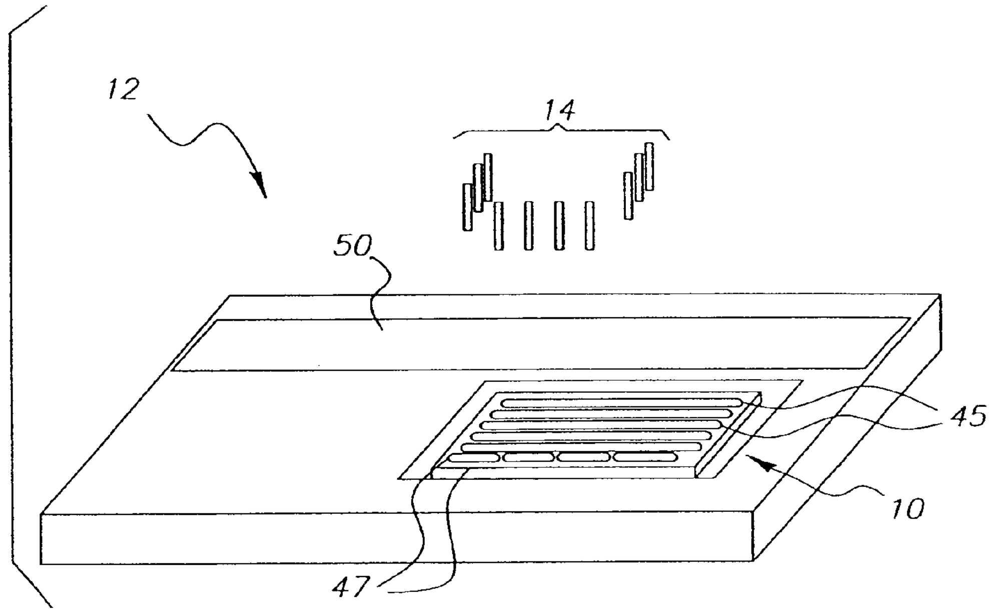
FIG. 8 a rear view of transaction card 12.

FIG. 8 is a front view of the display embodiment of FIG. 1. Display 10 is bonded in a recessed pocket of transaction card 12. Row conductors 45 and column conductors 47 are exposed and arranged to interconnect with contacts 14. Memory element 50 in this embodiment is a stripe of magnetic material. Memory element 50 and display 10 are located so that both components on transaction card 12 are machine accessible.

Figure 9:
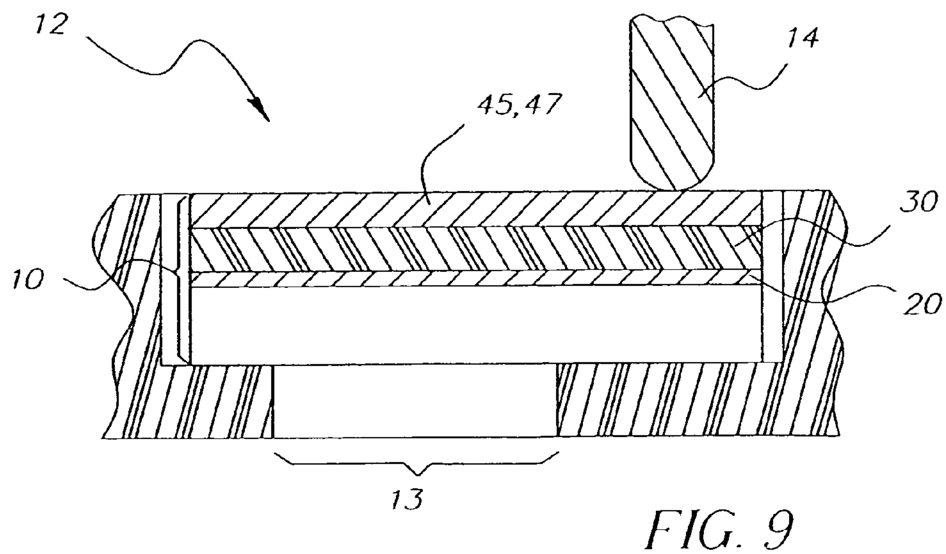
FIG. 9 is a section view of the transaction card assembly of FIG. 8.

FIG. 9 is a section view of the transaction card assembly of FIG. 8. Display 10 is mounted in a recess in transaction card 12. Viewing area 13 is an opening in the card material that permits viewing of 7 segment characters on display 10. The opening is disposed and contacts 14 are positioned so that contacts press against conductors on display 10 outside of viewing area 13.

Figure 10:
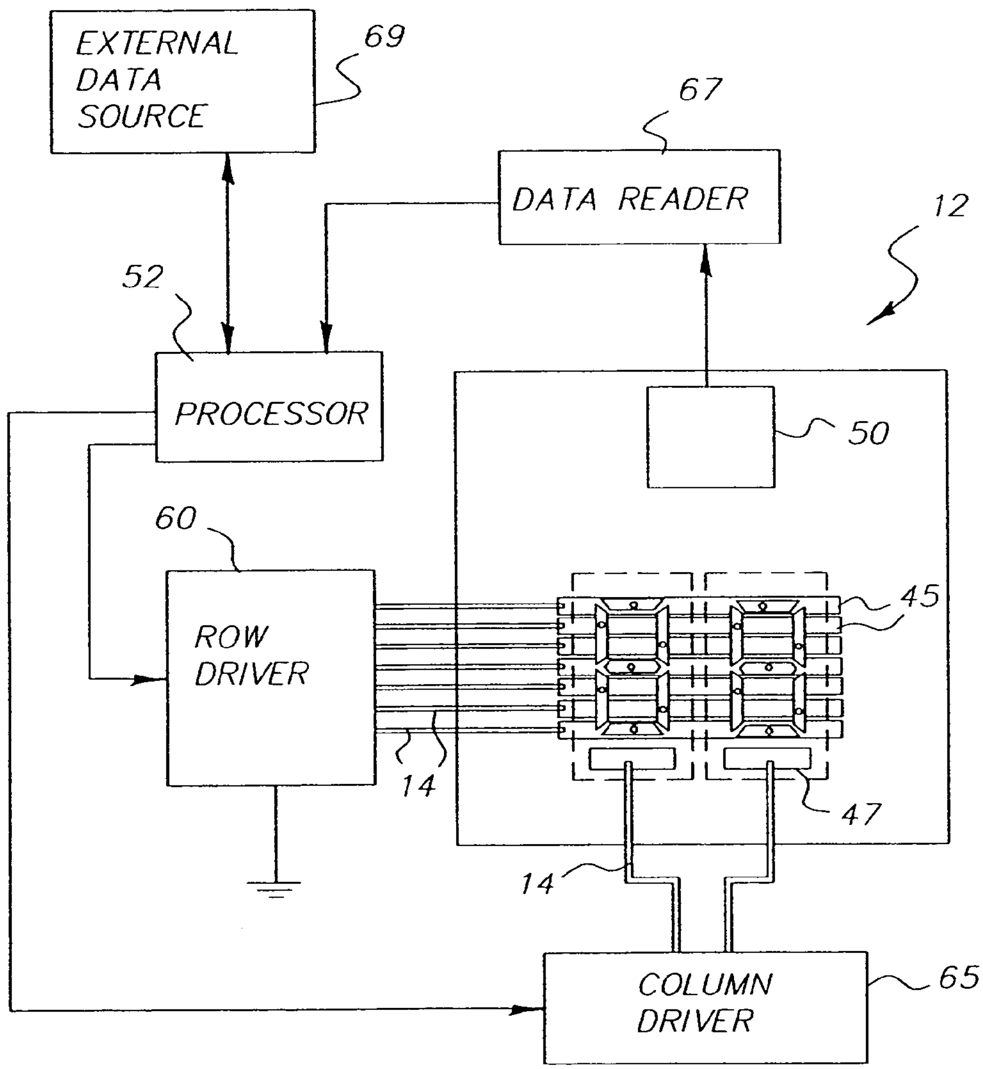
FIG. 10 is an electrical schematic of the transaction card assembly of FIG. 1 operating on conjunction to input machine readable data from the transaction card, operate on the information and update the display on the transaction card.

FIG. 10 is one embodiment of an electrical schematic of the transaction card assembly of FIG. 1 operating on conjunction to input machine readable data from the transaction card, operate on the information and update the display on the transaction card. Transaction card 12 is put into an apparatus containing processor 52. A data reader 67 acquires information from memory element 50. In the case that memory element is a SmartCard memory chip, data is sequentially read using an electrical connection to the memory chip. In the case that memory element is a magnetic stripe or barcode, the transaction card is moved relative to a reading mechanism to create a data stream that is read by processor 52. The data from the transaction card is operated on by processor 52 to generate new data that will be displayed on transaction card 12. An external data source 69 storing information related to the machine readable information on the transaction card and accessible by the processor 52 can be provided. The external data source 69 can be either remote and/or at a local terminal. A keyboard (not shown) can be used to input information, for example, by the card holder or by an employee of a commercial establishment.

The external data source 69 may contain, for example databases of information, measured parameters digital timing data that can be used by processor 52 to create new information to be displayed by transaction card 12. Row river 60 and column driver 65 are connected to processor 52. Contacts 14 which are connected to outputs from row driver 60 and column driver 65 are brought into contact with row conductors 45 and column conductors 47 respectively. The connection between contacts 14 and transaction card 12 can be performed using mechanical cams as transaction card 12 is inserted into apparatus or be electromechanically applied to transaction card 12 under command from processor 52.

Processor 52 then operates on row driver 60 and column driver 65 using any conventional cholesteric drive scheme to change the information shown on display 10 incorporated into transaction card 12. Processor 52 reads information from memory element 50, operates on that information and then writing though contacts 14 to a display 10 having polymer dispersed cholesteric materials. The polymer dispersion of the cholesteric material provides an updateable display 10 that does not require power, is pressure insensitive and can be flexed. The voltages required for cholesteric materials is very high relative to other display systems, and would require complex, expensive semiconductor elements if the display drive were incorporated into transaction card 12. Disposing row driver 60 and column driver 65 separate from transaction card 12 and selectively attaching them at the time that transaction card 12 is written eliminates the cost of drive elements on transaction card 12. Using a coated polymer dispersed cholesteric liquid crystal material provides a low cost transaction card 12.

Another aspect of the present invention relates to a transaction card system, methods of making a transaction card, and methods of using a transaction card. For example, a transaction card having machine readable information and a visible display can be made by a process involving providing a card body; applying an element for storing machine readable information to the card body; and producing a flexible display for displaying the display including a pressure insensitive polymer dispersed cholesteric liquid crystal material as described above, the display including an array of conductors for applying selected voltages from an external display driver to the display to change the state of the display; and affixing the display to the card body. In one embodiment, the display can be made by providing a polymer dispersed cholesteric liquid crystal dispersion wherein the polymer to liquid crystal ratio is sufficient to render a processed layer of the dispersion pressure insensitive, providing a substrate having a first conductor; coating the dispersion on the substrate; and printing the array of conductors onto the coated dispersion. Additional steps can include dispersing the cholesteric liquid crystal is dispersed an aqueous gelatin solution and including the step of drying the dispersion after coating.

A method of conducting a transaction can comprising the steps of providing a transaction card as described above, providing a card processor including a reader for reading the machine readable information, a processor for receiving the information and performing a calculation to produce information for display, and a writer having an array of contacts for contacting the array of conductors on the card for writing the calculated information onto the display, wherein the card processor is employed to initialize the displayed information on the card, wherein the card is used in a transaction and the card processor employed to update the display on the card, reflecting the results of the transaction.

The invention has been described in detail with particular reference to certain preferred embodiments thereof, but it will be understood that variations and modifications can be effected within the spirit and scope of the invention.

| PARTS LIST | |
|---|---|
| 10 | display |
| 12 | transaction card |
| 13 | viewing area |
| 14 | contacts |
| 15 | substrate |
| 17 | domain |
| 20 | first patterned conductors |
| 22 | planar state |
| 24 | focal conic state |
| 26 | incident light |
| 28 | reflected light |
| 30 | polymer dispersed cholesteric layer |
| 32 | connection area |

-continued

| PARTS LIST | |
|---|---|
| 40 | second patterned conductors |
| 42 | dielectric |
| 43 | through via |
| 45 | row conductors |
| 47 | column conductors |
| 50 | memory element |
| 52 | processor |
| 56 | outputs |
| 60 | row driver |
| 65 | column driver |
| 67 | data reader |
| 69 | external data source |
| FC | focal conic |
| P | planar |
| V1 | disturbance voltage |
| V3 | focal conic voltage |
| V4 | planar voltage |
| Vc | column voltage |
| VR | row voltage |

The invention claimed is:

1. A transaction card system, comprising:

a) a transaction card having a card substrate, machine readable information on the card substrate, a flexible, addressable matrix display affixed to the card substrate for displaying information related to the machine readable information, the display including a flexible transparent substrate, first transparent patterned conductors formed over said flexible transparent substrate, coated pressure-insensitive polymer-dispersed cholesteric liquid crystal material having a first planar reflective state and a second transparent focal conic state, wherein the ratio of polymer to liquid crystal is chosen to render the composition insensitive to pressure making it unnecessary to seal the edges of the liquid crystal material, which is responsive to an applied voltage to display information wherein said information persists when the voltage is removed, wherein said pressure-insensitive polymer-dispersed cholesteric liquid crystal material overlays said first transparent patterned conductor, second patterned conductors overlaying said polymer dispersed cholesteric material, wherein said first transparent patterned conductors and said second patterned conductors form an array; and row conductors interconnected to said second patterned conductors and arranged to interconnect with contacts, wherein said contacts are also connected to said first transparent patterned conductors, and wherein said contacts are connected to the display for applying selected voltages from an external source to the display to change the state of the pressure-insensitive polymer-dispersed cholesteric liquid crystal material; and b) a card processor including a reader for reading the machine readable information, a processor for receiving the information and performing a calculation to produce information for display, and writer having an array of contacts for contacting the array of conductors on the card for writing the calculated information onto the display.

2. The system claimed in claim 1 further comprising an external data source storing information related to the machine readable information on the card and accessible by the processor.

3. The system claimed in claim 1 wherein the writer includes row and column drivers for applying selected voltages to the row and column conductors.

4. The system claimed in claim 1 wherein the display is a passive matrix display driven by row and column voltages and wherein a low voltage has no effect on the state of the liquid crystal, an intermediate voltage produces a focal conic state and a high voltage produces a planar state in the liquid crystal.

5. The system claimed in claim 1 wherein the card substrate is a thermoplastic polymer selected from the group consisting of polyester and polycarbonate.

6. A method of conducting a transaction comprising the steps of:

a) providing a transaction card having a card substrate, machine readable information on the card substrate, a flexible, addressable matrix display affixed to the card substrate for displaying information related to the machine readable information, the display including a flexible transparent substrate, first transparent patterned conductors formed over said flexible transparent substrate, coated pressure-insensitive polymer-dispersed cholesteric liquid crystal material having a first planar reflective state and a second transparent focal conic state, wherein the ratio of polymer to liquid crystal is chosen to render the composition insensitive to pressure making it unnecessary to seal the edges of the liquid crystal material, which is responsive to an applied voltage to display information wherein said information persists when the voltage is removed, wherein said pressure-insensitive polymer-dispersed cholesteric liquid crystal material overlays said first transparent patterned conductor, second patterned conductors overlaying said polymer dispersed cholesteric material, wherein said first transparent patterned conductors and said second patterned conductors form an array; and row conductors interconnected to said second patterned conductors and arranged to interconnect with contacts, wherein said contacts are also connected to said first transparent patterned conductors, and wherein said contacts are connected to the display for applying selected voltages from an external source to the display to change the state of the pressure insensitive polymer-dispersed cholesteric liquid crystal material;

b) providing a card processor including a reader for reading the machine readable information, a processor for receiving the information and performing a calculation to produce information for display, and writer having an array of contacts for contacting the array of conductors on the card for writing the calculated information onto the display;

c) employing the card processor to initialize the displayed information on the card;

d) using the card in a transaction; and e) employing the card processor to update the display on the card, reflecting the results of the transaction.

* * * * *